US009323830B2

(12) United States Patent
Miao et al.

(10) Patent No.: US 9,323,830 B2
(45) Date of Patent: Apr. 26, 2016

(54) EMPIRICALLY DETERMINED SEARCH QUERY REPLACEMENT (71) Applicant: KOBO Incorporated, Toronto (CA)

(72) Inventors: Yingbo Miao, Toronto (CA); Jordan Christensen, Toronto (CA); Joshua Sumali, Toronto (CA)

(73) Assignee: RAKUTEN KOBO INC., Toronto (CA)

( * ) Notice: Subject to any disclaimer, the term of this patent is extended or adjusted under 35 U.S.C. 154(b) by 221 days.

(21) Appl. No.: 14/067,496

(22) Filed: Oct. 30, 2013

(65) Prior Publication Data
US 2015/0120689 A1 Apr. 30, 2015

(51) Int. Cl.
G06F 17/30 (2006.01)

(52) U.S. Cl.
CPC ...... G06F 17/3064 (2013.01); G06F 17/30864 (2013.01)

(58) Field of Classification Search
CPC .......... G06F 17/30864; G06F 17/3064; G06F 17/30; G06F 17/3097; G06F 17/30442; G06F 17/30554; G06F 17/30867; G06F 17/30991; G06Q 10/0637
USPC .................. 707/706, 765, 767, 713, E17.108, 707/E17.074, E17.069; 709/217, 218, 219; 705/7.36
See application file for complete search history.

(56) References Cited

U.S. PATENT DOCUMENTS

| | | | | |
|---|---|---|---|---|
| 2003/0115187 A1* | 6/2003 | Bode | ................. | G06F 17/30672 707/E17.074 |
| 2007/0174238 A1* | 7/2007 | Sareen | .............. | G06F 17/30864 707/E17.083 |
| 2007/0214133 A1* | 9/2007 | Liberty | ............... | G06F 17/3064 707/E17.108 |
| 2007/0239534 A1* | 10/2007 | Liu | ......................... | G06Q 30/02 705/14.46 |
| 2008/0091670 A1* | 4/2008 | Ismalon | .............. | G06F 17/3064 707/E17.108 |
| 2008/0140643 A1* | 6/2008 | Ismalon | ............. | G06F 17/3053 707/E17.109 |
| 2009/0119248 A1* | 5/2009 | Sundaresan | ....... | G06F 17/30672 707/E17.017 |
| 2011/0035403 A1* | 2/2011 | Ismalon | .............. | G06F 17/3064 707/769 |
| 2011/0040745 A1* | 2/2011 | Zaydman | .......... | G06F 17/30595 707/714 |
| 2011/0196821 A1* | 8/2011 | Hellerman | .......... | G06F 17/3089 707/600 |

(Continued)

OTHER PUBLICATIONS

Harry Halpin, and Victor Lavrenko—"Relevance feedback between hypertext and Semantic Web search: Frameworks and evaluation"—Web Semantics: Science, Services and Agents on the World Wide Web vol. 9, Issue 4, Dec. 2011, pp. 474-489 JWS special issue on Semantic Search.*

(Continued)

Primary Examiner — Anh Ly
(74) Attorney, Agent, or Firm — Oblon, McClelland, Maier & Neustadt, L.L.P.

(57) ABSTRACT

Systems and methods for automatically generating replacement query terms that offer improved search efficiency. Recommended search query terms are generated based on statistic information derived from empirical data recording prior search sessions with respect to searching on a search engine. A query term entered later in a search session is treated as a possible replacement term for a query term entered earlier in the same session. Upon receiving an initial query term in a new search session, the replacement terms of the initial query term are identified from the empirical data and evaluated as candidates for replacing the initial query term in the new search session. The evaluation is based on the respective occurrence rates that the candidates are used as replacement terms for the initial query term in the empirical data, and based on the respective conversion rates of the candidates.

17 Claims, 5 Drawing Sheets

(56) References Cited

U.S. PATENT DOCUMENTS

| | | | | |
|---|---|---|---|---|
| 2012/0084312 A1* | 4/2012 | Jenson | ............... | G06F 17/3097 707/767 |
| 2012/0124070 A1* | 5/2012 | Mishra | ............... | G06F 17/3097 707/767 |
| 2012/0157702 A1* | 6/2012 | Marciniec | ............ | C08G 77/045 556/446 |
| 2012/0158765 A1* | 6/2012 | Kumar | .............. | G06F 17/30646 707/766 |
| 2012/0284293 A1* | 11/2012 | Nierenberg | ....... | G06F 17/30654 707/766 |
| 2013/0103668 A1* | 4/2013 | Wullert, II | ........ | G06F 17/30979 707/710 |
| 2013/0346400 A1* | 12/2013 | Ramsey | ............ | G06F 17/30864 707/723 |
| 2014/0133569 A1* | 5/2014 | Alpert | .................... | H04N 19/51 375/240.16 |
| 2014/0172840 A1* | 6/2014 | Kumar | .............. | G06F 17/30867 707/723 |
| 2015/0039606 A1* | 2/2015 | Salaka | ................ | G06F 17/3064 707/730 |
| 2015/0066597 A1* | 3/2015 | Givoni | .............. | G06Q 10/0637 705/7.36 |

OTHER PUBLICATIONS

Lan Tien Nguyen; Beuran, R.; and Shinoda, Y.—"AEROMAN: A Novel Architecture to Evaluate Routing Protocols for Multi-Hop Ad-Hoc Networks" Published in: Computer Communications and Networks (ICCCN), 2010 Proceedings of 19th International Conference on—Date of Conference Aug. 2-5, 2010—pp. 1-7.*

* cited by examiner

EMPIRICALLY DETERMINED SEARCH QUERY REPLACEMENT

TECHNICAL FIELD

The present disclosure relates generally to the field of database search engines, and, more specifically, to the field of automatic generation of search query terms.

BACKGROUND

With the explosive growth of the amount of information available on Internet, search engines have been increasingly relied on to retrieve desired information from databases and/or webpages. A search engine can respond to a search query submitted by a user and can return one or more search results. Generally, a search query may be composed of any type of characters recognizable by the search engine and has to be specifically representative of the desired information for the search engine to locate it from the databases or webpages and return a correct search result.

For numerous reasons, a search engine user often submits a search query that is misspelled, inaccurate, and/or poorly correlated to the desired information stored in a database, and so does not obtain desired search result. Especially, information is often organized and indexed in databases in a manner that deviates from common-sense or popular expectation, causing difficulty trying to find an average user to find a representative query expression that matches the desired information based his or her intuition. Without getting the right or expected result, a user is usually forced to formulate a number of different search queries and iteratively run the search engine. The process is non-economical, time-consuming, frustrating and sometimes futile. In the situation that a user searches for items to purchase, an unsuccessful search experience can directly cause loss of potential transactions with the user.

A commonly adopted approach to facilitate a search process is to automatically generate and suggest alternative search queries after a user submits an initial and non-matching query. Conventionally, these suggested alternatives are merely generated based on semantic similarity or relatedness to the initial query, and are not adapted to the contents of the databases being searched and the associated search history. Although useful in correcting typos in an initial query, these query suggestions may be as impertinent as the initial query to obtain the desired search result. For example if the initial query had contained no typo but yet directs the search engine to an unintended category of subject matter.

SUMMARY OF THE INVENTION

Therefore, it would be advantageous to provide a mechanism of automatically generating search query suggestions offering improved search efficiency for a search engine. Accordingly, embodiments of the present disclosure employ a computer implemented method of automatically generating alternative search query terms based on statistic information derived from empirical data recording recorded prior search sessions with respect to searching on a search engine. For each prior search session, the empirical data includes a sequence of query terms entered by a user and outcome events indicative of the effectiveness of the respective query terms. An outcome event may be a user's action resulted from a query, such as a purchase action or a leave-without-purchase action. A query term entered later in a search session is regarded as a replacement term, or a correction term, for a query term entered earlier in the same session.

In accordance with an embodiment of the present disclosure, upon receiving an initial query term in a new search session, the replacement terms of the initial query term are identified from the empirical data and evaluated as candidates for replacing the initial query term in the new search session. Each candidate is accorded a score based on the occurrence rate that the candidate is used as a replacement term for the initial query term in the empirical data, and based on the rate that a desired outcome event is resulted from the candidate, e.g., a conversion rate for Internet shopping or marketing. Consequently, one or more alternative query terms can be selected based on the evaluation and recommended to the user for a subsequent search query. By correlating an initial query term submitted by a user with terms that have been used to replace the initial query term and have led to satisfactory outcome in previous search sessions, the replacement query terms can offer high probability of locating a user's intended information in new search sessions. In effect, the replacement term can automatically replace the user input term in order to yield a more relevant resultant search result.

In one embodiment of the present disclosure, a computer implemented method is described of searching one or more digital databases through a search engine in response to search queries submitted by users and comprises: (1) accessing a first query term entered by a user; (2) accessing statistic information representing a first probability of yielding a predefined event by replacing the first query term with a second query term for searching the one or more digital databases, and a second probability of yielding the predefined event by using the first query term for searching the one or more digital databases, wherein the statistic information is derived from prior searching activities by a plurality of users with respect to the search engine; (3) determining a resultant query term based on the first probability and the second probability; and (4) searching the digital databases by using the resultant query term. The digital databases may comprise an inventory database of an on-line store, and wherein further the predefined event comprises a purchase action. The first probability may be determined based on collective occurrences of receiving the second query term subsequent to receiving the first query term in respective searching sessions of the prior searching activities with respect to the search engine, and based on a conversion rate associated with the second query term. The second probability may be determined based on collective occurrences of receiving the first query term in the prior searching activities and based on a conversion rate associated with the first query term. The prior searching activities may comprise: a sequence of search query terms entered by a respective user in a respective prior searching session; a purchase action in the respective prior searching session, or a leave-without-purchase action in the respective prior searching session. The first query term and the second query term may be semantically dissimilar.

In another embodiment of present disclosure, a non-transitory computer-readable storage medium embodying instructions that, when executed by a processing device, cause the processing device to perform a method of automatically suggesting an alternative search query based on recorded search activities on an electronic search engine, the method comprising: (1) accessing a record of a plurality of search sessions performed on the electronic search engine, wherein the record comprises: for a respective search session, a plurality of search query terms entered by a respective user in a sequence; and an outcome event following the plurality of query terms; (2) accessing an original query term in a search session; (3) identifying a plurality of candidate replacement terms from the record based on the original query term; (4) calculating a first occurrence rate of a predefined event resulted from using the original query term for searching, based on the record; (5) calculating respective occurrences rates of the predefined event resulted from using each candidate replacement term over the plurality of candidate replacement terms for searching subsequent to using the original query term for searching, based on the record; and (6) determining a resultant query term based on the first occurrence rate and the respective occurrence rates.

In another embodiment of present disclosure, a system comprises: a processor; a network circuit; and a memory coupled to the processor and comprising instructions that, when executed by the processor, cause the system to perform a method of searching a digital database in response to a search query submitted by a user, the method comprising: (1) accessing a first query term entered by a user; (2) accessing statistic information representing a first probability of yielding a predefined event by replacing the first query term with a second query term for searching the database, and a second probability of yielding the predefined event by using the first query term for searching the database, wherein the statistic information is derived from prior searching activities with respect to searching the digital database; (3) determining a recommended query term based on the first probability and the second probability; and (4) searching the digital database by using the recommended query term.

This summary contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in a orientation.

NOTATION AND NOMENCLATURE

It should be borne in mind, however, that all of these and similar are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Empirically Determined Search Query Replacement

Statistically speaking, a particular non-matching query term has probably been submitted to a search engine by numerous prior users who intend to search for the same information. Some of these users eventually come up with a matching query term after trying a number of different query terms within a given session and obtain the intended information. Thus, the statistic information collected from prior search sessions can be used to predict a new user's intended information and accordingly to generate effective replacement query terms.

Figure 1:
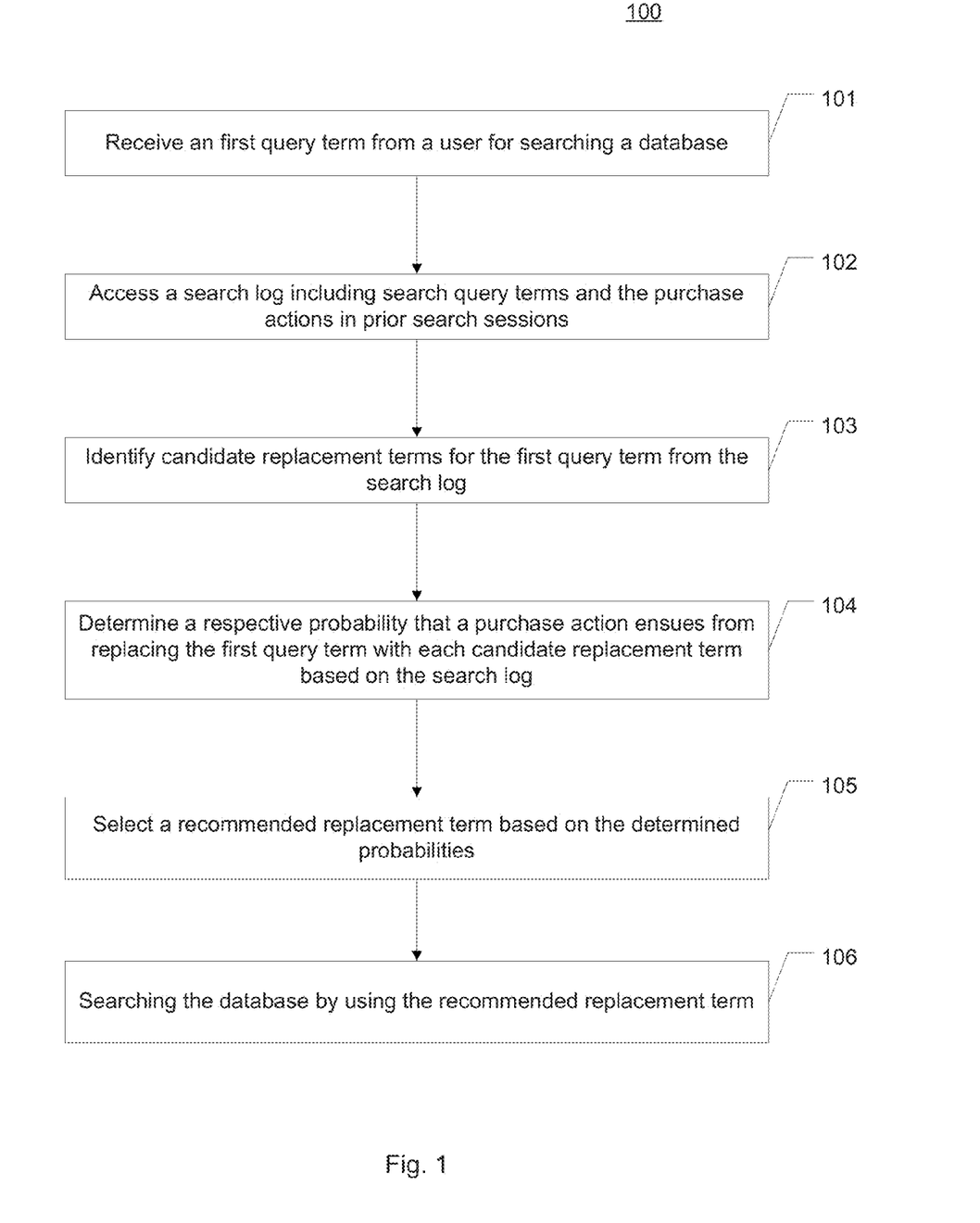
FIG. 1 is a flow chart depicting an exemplary computer implemented method of searching databases through a search engine by using a suggested replacement term that is generated based on empirical data in accordance with an embodiment of the present disclosure.

The process of FIG. 1 illustrate a mechanism that is used to determine a replacement query term based on (1) a user input query term and (2) prior recorded statistic data based on prior searches done by database users and their eventual user actions within those prior search sessions. The process 100 can automatically determine the replacement term and automatically replace the use input term with the replacement term in order to provide better or more relevant results for the user.

More specifically, FIG. 1 is a flow chart depicting an exemplary computer implemented method 100 of searching databases through a search engine by using a suggested replacement term that is generated based on empirical data in accordance with an embodiment of the present disclosure. At 101, a first query term is received by the search engine from a user in a new search session. For example the search engine is configured to receive search queries through a browser based graphic user interface (GUI) and search one or more databases responsive to the queries. At 102, a search log is accessed to acquire the statistic information derived from the empirical data with respect to the first query term. The search log encompasses a record of user activities (search terms and user action events) in prior search sessions. In some embodiments, a search log may be specific to a search engine or to a database.

For each prior search session, the search log includes a sequence of query terms submitted to the search engine and the order that they were received in the session. Associated with each submitted query term is an action event indicative of effectiveness of the query term in terms of producing satisfactory search result to the user, such as for instance a purchase action led by a search result, a leave action, or alike. In some embodiments, a purchase action is treated as a conclusion of a session; and a leave action can be defined as an action of closing the browser's window, or lack of user interactions for a predetermined interval.

At 103, a plurality of candidate replacement terms are selected from the search tog based on the first query term. In some embodiments, a query term entered to the search log later in a search session is treated as a replacement term, or a correction term, for a query term entered earlier in the same session. Thus, the candidate replacement terms for the first query term can be located in the sessions in which the first query term was submitted for search, and correspond to the query terms entered subsequent to the first query term in respective sessions.

At 104, based on the relevant search log information, a respective probability that a desired event can ensue from replacing the first query term with each candidate replacement term is determined. As will be appreciated by those skilled in the art, the definitions of the outcome events and a desired event may vary in different embodiments depending on the content in the databases as well as different purposes for providing the search, e.g., promoting purchase transactions. In some embodiments, a desired event may be defined as a purchase action resulted from using a query term, which is regarded as indicative of effectiveness of the particular query term with respect to providing a satisfactory search result to the user. The probability that a desired event ensures the first query term can also be computed based on the search log.

At 105, based on the determined probabilities, a replacement term is automatically selected from the candidate replacement terms and recommended to the user. In some other embodiments, more than one replacement term can be generated and presented to the user. At 106, a search is performed by using the recommended replacement term, for example upon the user's confirmation on the recommendation. In other embodiments, the user input term may be automatically replaced with the replacement term without user conformation or knowledge.

Therefore, a recommended replacement query term according to the present disclosure is selected from terms that have been used to replace the first query term by other users and that have led to a satisfactory outcome in previous search sessions. Thus, the recommended terms can offer high probability of locating a user's intended information in the new search session. Thereby, a user can found the desired result in significantly reduced search iterations. Embodiments of the present invention can be used to increase the rate of conversion for each search performed, e.g., for an on-line store, etc.

Method 100 can be transparent to the types of characters or languages used in the databases and the query terms, in some embodiments, the recommended replacement terms can be derived from empirical data regardless of their semantic similarity with the initial query term. In some other embodiments, method 100 can be combined with the semantic approach or any other suitable approach that is welt known in ti art to determine replace ent query terms.

A database referred herein may be any suitable type of organized collection of data accessible to the public or to authorized users, such as an inventory database of an online store, a private database within an organization or entity, and an Internet encyclopedia. The present disclosure is not limited to any specific type of search engine. For example, a search engine referred herein may be a web search engine configured to search multiple databases, or a search tool configured for a particular database.

Figure 2:
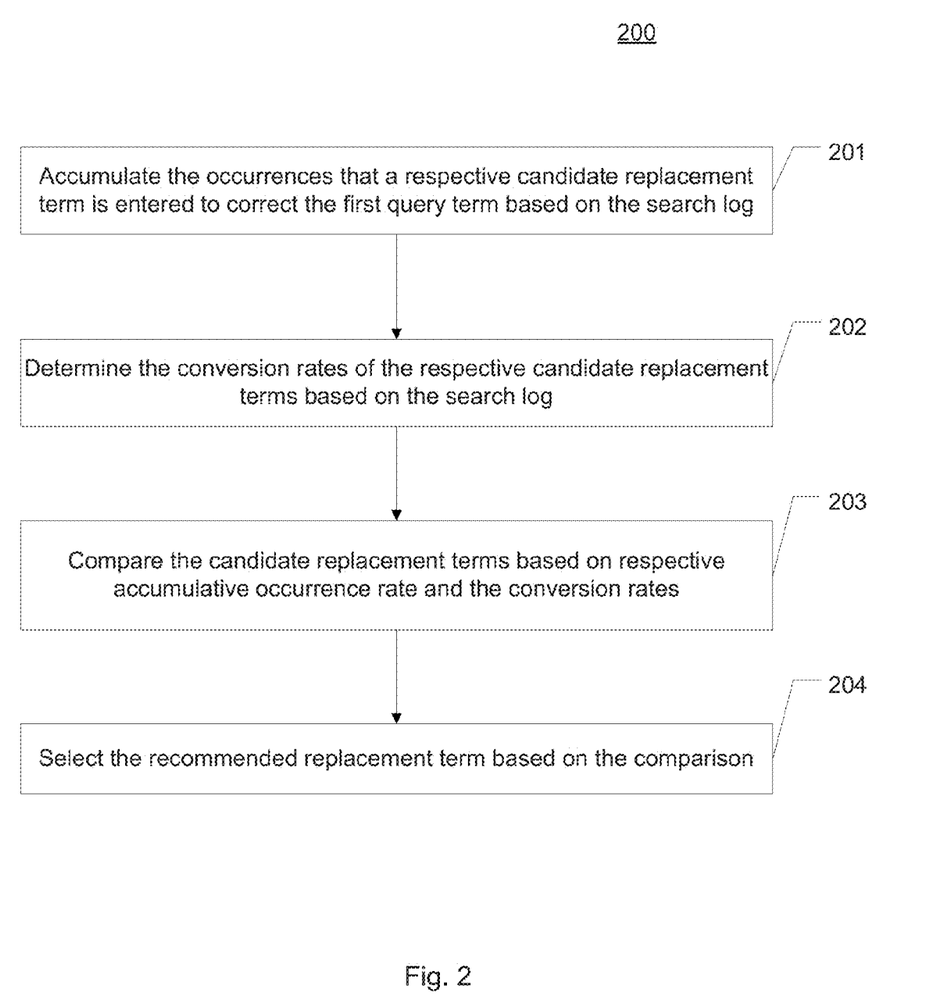
FIG. 2 is a flow chart illustrating an exemplary computer implemented method of determining a recommended replacement query term based on empirical data with respect to a shopping search engine in accordance with an embodiment of the present disclosure.

FIG. 2 is a flow chart illustrating an exemplary computer implemented method 200 of determining a recommended replacement query term based on empirical data with respect to a shopping search engine in accordance with an embodiment of the present disclosure. In a new search session, corresponding search log information is accessed based on a received initial search query. In some embodiments, query pairs may be defined for purposes of identifying possible replacement terms for a particular query term based on the search log.

For example, a query pair $(q_a, q_b)$ represents a pairs of an old query and a new query. A query pair may be followed by a user action or event, e.g., a purchase action, or a leaving action. Each query of a search action in a session is taken as an old query, and any query after it pairs with it as a new query. The last query in the session pairs with itself. For example, a search session may be mathematically represented as a vector $$S=[q_1, q_2, q_3, p],$$

where $q_i$ (i=1, 2, and 3) represents the $i_{th}$ search in the session, p represents a purchase action, and l represents a leaving action. The query pairs and the respective following actions can be associated and represented as $(q_1,q_2,l)$ $(q_1,q_3,p)$, $(q_2,q_3,p)$ and $(q_3,q_3,l)$.

After a user performs a search action s with a query term q, all query pairs in the search log that start with q can be identified, representable as a vector $$E=\{(q,q_1),(q,q_2),(q,q_3),\ldots,(q,q_m)\}.$$

Accordingly, the occurrences that a respective candidate replacement term is entered to correct the first query term cat be accumulated based on the search log at 201.

At 202, the conversion rates of the candidate replacement terms are determined based on the search log. A query conversion of a query term q can be defined as $$c(q) = \frac{p(q)}{f(q)},$$

where p(q) represents the number of purchase actions caused by the query term q in the search log, and f(q) is the number of search actions performed using query term q.

Then each candidate replacement term can be scored by calculating $$r(q_i) = p(q_i, q) \times c(q_i) = \frac{f(q_i, q)}{f_q} \times c(q_i).$$

At 203, the candidate replacement terms are then compared based on the scores that are calculated based on respective occurrence rates and the conversion rates.

At 204, a replacement term is selected based on the comparison. For example, the best query can be defined as $$\text{argmax}_{q_i}(r(q_i)).$$

Particularly, if $q_i=q$, there is no query replacement suggested. Otherwise, $q_i$ is recommended.

In some embodiments, the search log only includes data collected from searches based on personally selected query terms by the users. In some other embodiments, the search log can be updated with search sessions using recommended replacement terms generated according to the present disclosure. For example, a search action with $q_2$ is replaced b the recommended term $q_b$ that is automatically generated according to the present disclosure. After $q_b$ is used for performing a search, a query pair $(q,q_b)$ can be defined which can also be associated with l or p. Then the session can be represented as a vector $$[q_1,q_2 \leftarrow q_3,q_3,p].$$

The query pairs derived from the vector include $(q_1,q_2,l)$, $(q_1,q_3,p)$, $(q_2,q_3,p)$, $(q_3,q_3,l)$ and a new pair $(q_2, q_b,l)$. The score of a respective candidate replacement term becomes $$r(q_i) = \frac{f(q_i, q) \times \sum_k f((qb_k, q, p)) \times c(qb_k)}{f_q + \sum_j f((qb_j, q, l)) \times c(qb_j)}$$

Figure 3A:
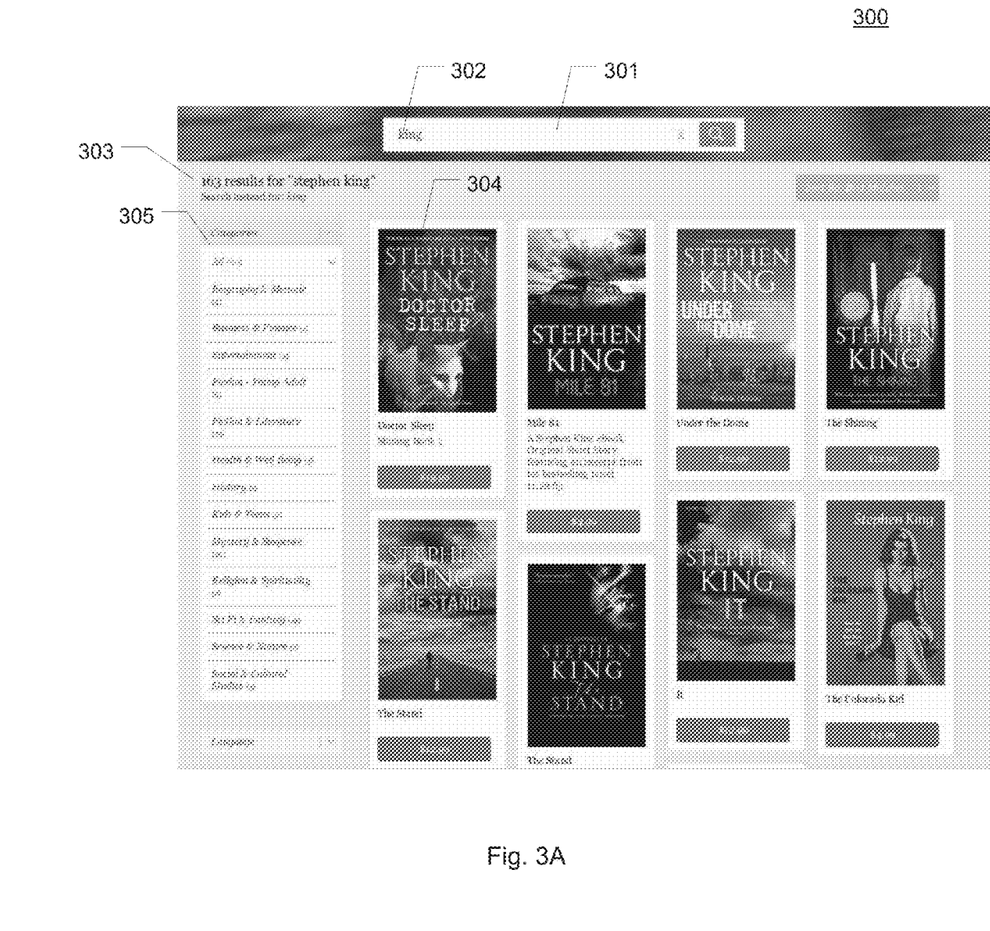
FIG. 3A illustrates an exemplary on-screen GUI configured to present a recommended replacement query term as well as the search results caused thereby based on an original query term submitted by a user.

The present disclosure is not limited to any specific manner of presenting a recommended replacement term to a user or replacement method, e.g., transparent to user or user confirmation. FIG. 3A illustrates an exemplary on-screen GUI 300 configured to present a recommended replacement term as well as the search results caused thereby based on an original query term submitted by a user. In this example, the search engine and the GUI 300 are hosted by an online book store. Thus, the search results intended by a user are presumed to be pertinent to book items. In the search bar 301, it displays that the user's entry is "king." As described in greater detail, based on the above described statistic information provided by the search log, the search engine determines that replacing "king" with "stephen king" likely produces the desired search result for the user. Thus, a search is performed by using "stephen king," as indicated by 303. Thereby, a collection of book items pertinent to "stephen king" are presented to the user, e.g., starting with the highest-purchased item 304. A menu 305 summarizing the categories of the search results is also presented. In some other embodiments, a number of recommendation replacement terms can be presented and subject to user's selection before a search is performed.

Figure 3B:
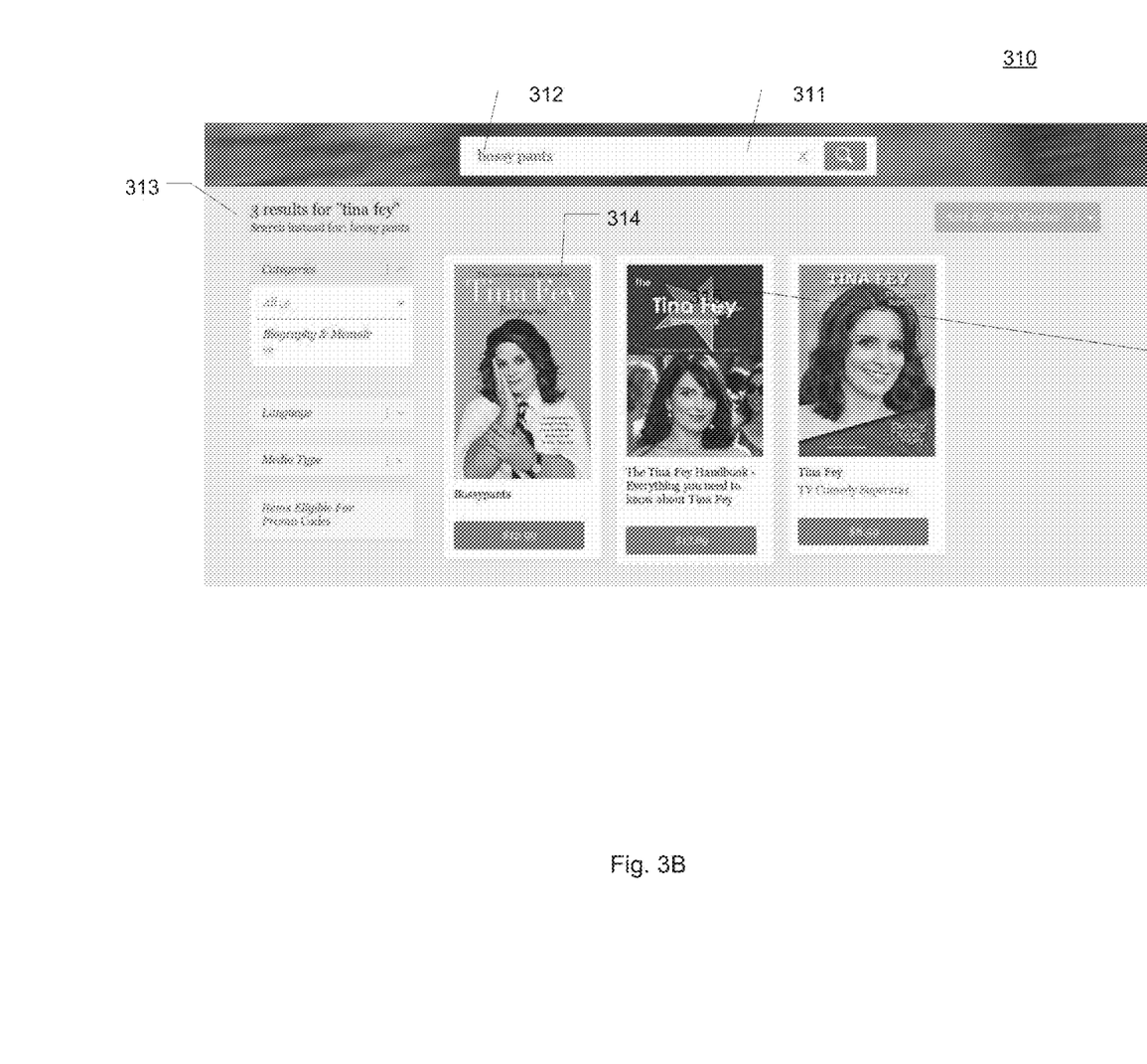
FIG. 3B illustrates another exemplary on-screen GUI configured to present a recommended replacement term as well as the search results caused thereby based on an original query term submitted by a user.

FIG. 3B illustrates another exemplary on-screen GUI 310 configured to present a recommended replacement term as well as the search results caused thereby based on an original query term submitted by a user. In this example, the user's entry is "bossy pants" 313 in the searching bar 311. Due to the added space in the query term 312 the user's entry does not match exactly the book title Bossypants which is probably the book that the user wants to view and buy. Based on the above described statistic information provided by the search log, the search engine determines that replacing "bossy pants with the author's name, "Tina Fey," likely produces the desired search result for the user. Thus, a search is performed by using "Tina Fey," as indicated by 313 and yields a collection of book items pertinent to "Tina Fey" including the bossypants. As demonstrated by this example, despite the semantic dissimilarity between "bossy pants" and "Tina Fey," they are correlated by the search history according to the present disclosure. As shown, the replacement term "Tina Fey" can results the desired search result Bossypants 314.

In some embodiments, the process of generating recommended replacement terms can be performed on a server device, e.g., hosted by an on-line store or a book publisher, while the respective GUIs can be rendered on a remote client device to receive input which is then communicated to the server device for processing. In some other embodiments, a similar process can be performed on the same computing device that receives user input locally.

Figure 4:
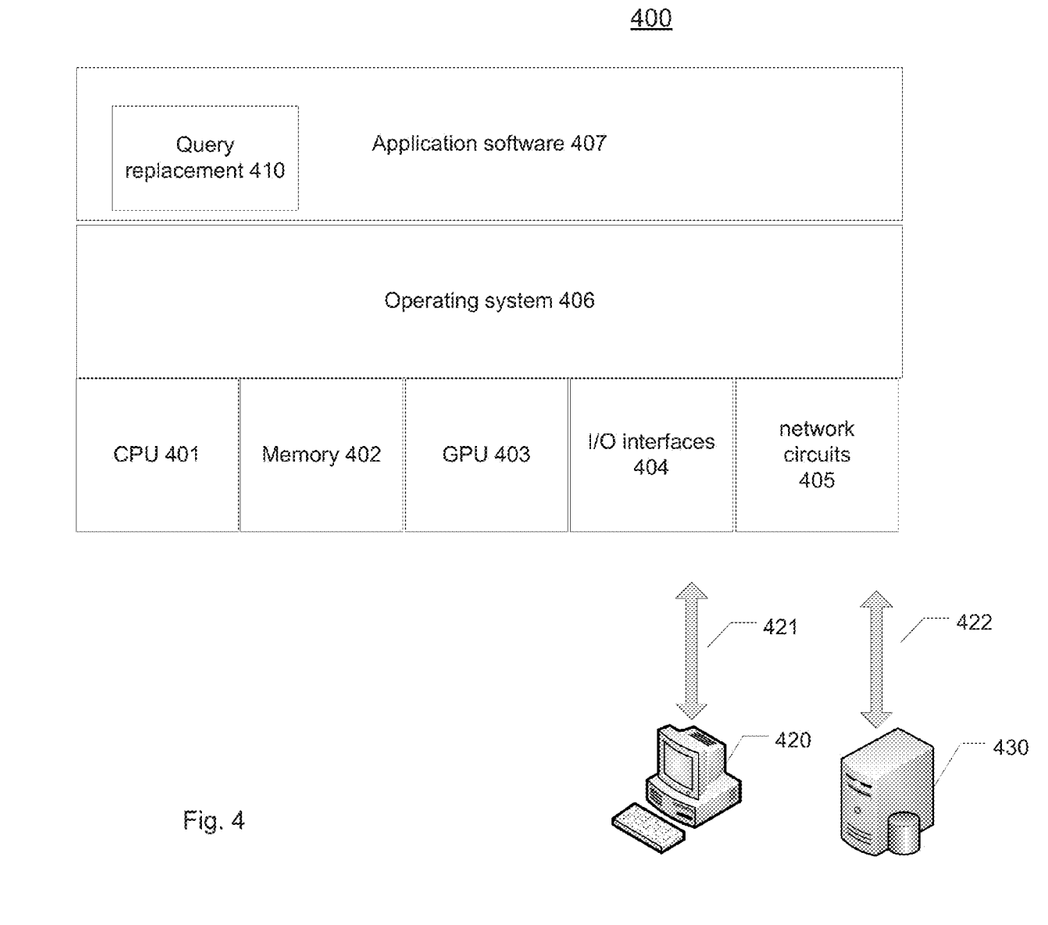
FIG. 4 is a block diagram illustrating an exemplary computing system including an automated replacement query term generator in accordance with an embodiment of the present disclosure.

FIG. 4 is a block diagram illustrating an exemplary computing system 400 including an automated replacement query term generator 410 in accordance with an embodiment of the present disclosure. The computing system comprises a processor 401, a system memory 402, a GPU 403, I/O interfaces 404 and network circuits 405, an operating system 406 and application software 407 including the automated replacement query term generator 410 stored in the memory 402. When incorporating the user's configuration input and executed by the CPU 401, the automated replacement query term generator 410 can automatically generate recommended query terms based on empirical data, present the recommendations on a GUI, and update a search log in accordance with an embodiment of the present disclosure. The automated replacement query term generator 410 may perform other various functions and processes as discussed in detail with reference to FIG. 1-3. As wilt be appreciated by those with ordinary skills in the art, the automated replacement query term generator 410 can be implemented in any one or more suitable programming languages that are known to those skilled in the art, such as C, C++, Java, Python, Pert, C#, SQL, etc.

A search log may be stored in the same system with or a different system than the system 400. For example, the system 400 may communicate with a server machine 430 through a network 430 to access the search log. The system 400 may also communicate with a client terminal 420 through the network 421 to receive search queries from a user through a GUI.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of searching one or more digital databases through a search engine in response to search queries submitted by users, said computer implemented method comprising:

accessing a first query term entered by a user;

accessing statistic information representing a first probability of yielding a predefined event by replacing said first query term with a second query term for searching said one or more digital databases, and a second probability of yielding said predefined event by using said first query term for searching said one or more digital databases, wherein said statistic information is derived from prior searching activities by a plurality of users with respect to said search engine;

determining a resultant query term based on said first probability and said second probability by:

comparing said first probability and said second probability; and selecting said resultant query term between said first query term and said second query term based on said comparing said first probability and said second probability; and searching said one or more digital databases by using said resultant query term.

2. The computer implemented method of claim 1, wherein said one or more digital databases comprises an inventory database of an on-line store, and wherein further said predefined event comprises a purchase action.

3. The computer implemented method of claim 1, wherein said first probability is determined based on collective occurrences of receiving said second query term subsequent to receiving said first query term in respective searching sessions of said prior searching activities with respect to said search engine, and based on a conversion rate associated with said second query term; and wherein said second probability is determined based on collective occurrences of receiving said first query term in said prior searching activities and based on a conversion rate associated with said first query term.

4. The computer implemented method of claim 3, wherein said prior searching activities comprises: a sequence of search query terms entered by a respective user in a respective prior searching session; a purchase action in said respective prior searching session, or a leave-without-purchase action in said respective prior searching session.

5. The computer implemented method of claim 1 further comprising:

causing to be rendered on a display a graphic user interface (GUI) comprising an on-screen area configured to receive said first query term;

causing to be rendered on a display said second query term on said GUI as a suggested query replacement; and receiving a user confirmation to select said second query term for searching through said search engine.

6. The computer implemented method of claim 1, wherein said first query term and said second query term are semantically dissimilar.

7. A non-transitory computer-readable storage medium embodying instructions that, when executed by a processing device, cause said processing device to perform a method of suggesting an alternative search query based on recorded search activities on an electronic search engine, said method comprising:

accessing a record of a plurality of search sessions of a plurality of users performed on said electronic search engine, wherein said record comprises:

for a respective search session, a plurality of search query terms entered by a respective user in a sequence; and an outcome event following said plurality of query terms;

accessing an original query term in a search session;

identifying a plurality of candidate replacement terms from said record based on said original query term;

identifying a set of search sessions from said record, wherein said original query term is used for searching during each of said set of search sessions, and wherein said plurality of candidate replacement terms correspond to search query terms entered subsequent to said original query term in respective search sessions of said set of search sessions;

calculating a first occurrence rate of a predefined event resulted from using said original query term for searching, based on said record regarding said plurality of search sessions;

calculating respective occurrence rates of said predefined event resulted from using each candidate replacement term over said plurality of candidate replacement terms for searching subsequent to using said original query term for searching, based on said record regarding said plurality of search sessions; and determining a resultant query term based on said first occurrence rate and said respective occurrence rates.

8. A non-transitory computer-readable storage medium of claim 7, wherein said electronic search engine is a web search engine configured to search commodities from an on-line store.

9. A non-transitory computer-readable storage medium of claim 7, wherein said outcome event corresponds to a purchase action or a leave-without-purchase action, and wherein said predefined event corresponds to a purchase action.

10. A non-transitory computer-readable storage medium of claim 7, wherein said calculating comprises:

forming query pairs by associating said original query term with itself and with each of said candidate replacement terms;

determining conversion rates of said original query term and said plurality of candidate replacement terms based on said record; and ranking said original quint term and said candidate replacement temps based on respective occurrence rates of said query pairs and said conversion rates.

11. A non-transitory computer-readable storage medium of claim 10, wherein said determining a resultant query term comprises selecting from said original query term and said candidate replacement terms based on said ranking.

12. A non-transitory computer-readable storage medium of claim 7, wherein said method further comprises presenting a resultant query term on a graphic user interface (GUI) if said resultant query term is different from said original query term, and performing a search of a database by using said resultant query term on said electronic search engine in response to a predefined user interaction with said GUI.

13. A non-transitory computer-readable storage medium of claim 7, wherein said plurality of search query terms in said respective search session comprises terms of different languages.

14. A system comprising:

a processor;

a network circuit; and a memory coupled to said processor and comprising instructions that, when executed by said processor, cause the system to perform a method of searching a digital database in response to a search query submitted by a user, said method comprising:

accessing a first query term entered by a user;

accessing statistic information representing a first probability of yielding a predefined event by replacing said first query term with a second query term for searching said database, and a second probability of yielding said predefined event by using said first query term for searching said database, wherein said statistic information is derived from prior searching activities with respect to searching said digital database;

determining a recommended query term based on said first probability and said second probability by:

comparing said first probability and said second probability; and selecting said recommended query term between said first query term and said second query term based on said comparing said first probability and said second probability; and searching said digital database by using said recommended query term.

15. The system of claim 14, wherein said digital database comprise commodity items, wherein said predefined event comprises a purchase action ensuing search queries, wherein said first probability is determined based on collective occurrences of receiving said second query term subsequent to receiving said first query term in said prior searching activities with respect to said digital database, and based on a conversion rate associated with said second query term, and wherein further said second probability is determined based on collective occurrences of receiving said first query term in said prior searching activities with respect to said digital database, and based on a conversion rate associated with said first query term.

16. The system of claim 14, wherein said prior searching activities comprise: search query terms entered by a respective user in a sequence in a respective prior searching session; a purchase action in said respective prior searching session; and leave-without-purchase action in said respective prior searching session.

17. The system of claim 14, wherein said method further comprises:

causing to be rendered on a display a graphic user interface (GUI) comprising an area configured to receive said first query term;

causing to be rendered on a display said second query term on said GUI; and receiving a user confirmation to use said second query term for searching said digital database.

\* \* \* \* \*